United States Patent
Slavens et al.

(10) Patent No.: US 10,259,039 B2
(45) Date of Patent: Apr. 16, 2019

(54) GAS TURBINE ENGINE COMPONENT COOLING PASSAGE AND SPACE CASTING CORE

(71) Applicant: United Technologies Corporation, Hartford, CT (US)

(72) Inventors: Thomas N. Slavens, Vernon, CT (US); Lane Thornton, Meriden, CT (US); Sasha M. Moore, East Hartford, CT (US); Nicholas M. LoRicco, Coventry, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 725 days.

(21) Appl. No.: 14/766,061

(22) PCT Filed: Jan. 16, 2014

(86) PCT No.: PCT/US2014/011833
§ 371 (c)(1),
(2) Date: Aug. 5, 2015

(87) PCT Pub. No.: WO2014/126674
PCT Pub. Date: Aug. 21, 2014

(65) Prior Publication Data
US 2015/0375297 A1     Dec. 31, 2015

Related U.S. Application Data

(60) Provisional application No. 61/763,661, filed on Feb. 12, 2013.

(51) Int. Cl.
*B22D 19/00*     (2006.01)
*B22D 29/00*     (2006.01)
(Continued)

(52) U.S. Cl.
CPC ............ *B22D 19/0072* (2013.01); *B22C 9/04* (2013.01); *B22C 9/103* (2013.01); *F01D 5/187* (2013.01);
(Continued)

(58) Field of Classification Search
CPC .... B22D 19/00; B22D 19/0072; B22D 29/00; B22D 29/001; B22C 9/04; B22C 9/10; B22C 9/103
(Continued)

(56) References Cited

U.S. PATENT DOCUMENTS 5,259,730 A   11/1993   Damlis et al.
5,431,537 A   7/1995    Sturm
(Continued)

FOREIGN PATENT DOCUMENTS

| EP | 1764170 | 3/2007 |
|----|---------|--------|
| EP | 1813775 | 8/2007 |
| EP | 2392774 | 12/2011 |

OTHER PUBLICATIONS

Extended European Search Report for European Application No. 14752037.3 dated Jul. 7, 2016.
(Continued)

*Primary Examiner* — Kevin P Kerns
(74) *Attorney, Agent, or Firm* — Carlson, Gaskey & Olds, P.C.

(57) ABSTRACT

A method of manufacturing a component that includes providing a core structure, casting a component about the core structure, removing a first portion of the core structure from the cast component, and leaving a second portion of the core structure in the cast component to provide a reduced cross-section in the cast component.

5 Claims, 3 Drawing Sheets

(51) Int. Cl.
  *B22C 9/10* (2006.01)
  *B22C 9/04* (2006.01)
  *F01D 5/18* (2006.01)
  *F01D 9/02* (2006.01)
  *F23R 3/00* (2006.01)

(52) U.S. Cl.
  CPC .............. *F01D 9/023* (2013.01); *F23R 3/002* (2013.01); *F05D 2230/211* (2013.01); *F05D 2250/185* (2013.01); *Y02T 50/676* (2013.01)

(58) Field of Classification Search
  USPC .................................................. 164/98, 132
  See application file for complete search history.

(56) References Cited

U.S. PATENT DOCUMENTS

| | | | |
|---|---|---|---|
| 5,915,452 A | 6/1999 | Conroy et al. | |
| 5,924,843 A | 7/1999 | Staub et al. | |
| 6,241,000 B1 | 6/2001 | Conroy et al. | |
| 7,857,588 B2 | 12/2010 | Propheter-Hinckley et al. | |
| 8,235,664 B2 | 8/2012 | Carchedi | |
| 2003/0026698 A1 | 2/2003 | Flodman et al. | |
| 2007/0056709 A1* | 3/2007 | Schmidt et al. | B22C 9/04 164/132 |
| 2008/0110024 A1 | 5/2008 | Reilly et al. | |
| 2009/0226300 A1 | 9/2009 | Knapp et al. | |
| 2010/0054953 A1 | 3/2010 | Piggush | |
| 2012/0269648 A1 | 10/2012 | Lee | |
| 2013/0025288 A1* | 1/2013 | Cunha et al. | F23R 3/002 60/772 |
| 2014/0010666 A1* | 1/2014 | Hudson et al. | F01D 5/186 416/97 R |

OTHER PUBLICATIONS

International Preliminary Report on Patentability for Application No. PCT/US2014/011833 dated Aug. 27, 2015.
International Search Report and Written Opinion for Application No. PCT/US2014/011833 completed Apr. 22, 2014.

* cited by examiner

GAS TURBINE ENGINE COMPONENT COOLING PASSAGE AND SPACE CASTING CORE

BACKGROUND

This disclosure relates to a gas turbine engine component, such as an airfoil. More particularly, the disclosure relates to a component cooling passage having an obstruction and a core for making the component cooling passage.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages. In some applications, such as vanes, a baffle is provided in the cooling passage to reduce the cross-sectional area of the cooling passage and increase cooling fluid velocity. Typically, the baffles are constructed from sheet metal inserted into the vane after the vane has been cast.

SUMMARY

In one exemplary embodiment, a method of manufacturing a component that includes providing a core structure, casting a component about the core structure, removing a first portion of the core structure from the cast component, and leaving a second portion of the core structure in the cast component to provide a reduced cross-section in the cast component.

In a further embodiment of any of the above, the core structure includes first and second materials. The first material corresponds to the first portion, and the second material corresponds to the second portion.

In a further embodiment of any of the above, the first and second materials are different than one another.

In a further embodiment of any of the above, the first material is ceramic.

In a further embodiment of any of the above, the second material includes a refractory metal.

In a further embodiment of any of the above, the core structure includes a perimeter. The cast component entirely engages the perimeter during the casting step. The second portion is spaced from the cast component during the leaving step.

In a further embodiment of any of the above, the passage is a cooling passage.

In another exemplary embodiment, a gas turbine engine includes a structure having walls that provide a cooling passage and a cooling surface. A non-ferrous obstruction is relative to the walls. The obstruction includes a portion spaced from the cooling surface to provide a gap which is configured to receive a cooling fluid.

In a further embodiment of any of the above, the structure is an airfoil.

In a further embodiment of any of the above, the structure is a blade outer air seal.

In a further embodiment of any of the above, the structure is a platform that supports an airfoil.

In a further embodiment of any of the above, the structure is a combustor line

In a further embodiment of any of the above, the structure is an exhaust liner.

In a further embodiment of any of the above, the obstruction is arranged to block a flow of the cooling fluid through the cooling passage.

In a further embodiment of any of the above, the obstruction includes a refractory metal.

In a further embodiment of any of the above, the obstruction provides multiple gaps adjacent to the cooling surface.

In a further embodiment of any of the above, the structure includes a nickel alloy, and the obstruction is provided by a material that is different than the nickel alloy.

In another exemplary embodiment, a core structure for providing a gas turbine
engine a cooling passage includes a first material provided on a second material and together provides a perimeter. The first material is provided along multiple portions of the perimeter with the second material separating the multiple portions.

In a further embodiment of any of the above, the first and second materials are different than one another.

In a further embodiment of any of the above, the first material is ceramic.

In a further embodiment of any of the above, the second material includes a refractory metal.

BRIEF DESCRIPTION OF THE DRAWINGS

The disclosure can be further understood by reference to the following detailed description when considered in connection with the accompanying drawings wherein.

DETAILED DESCRIPTION

Figure 1:
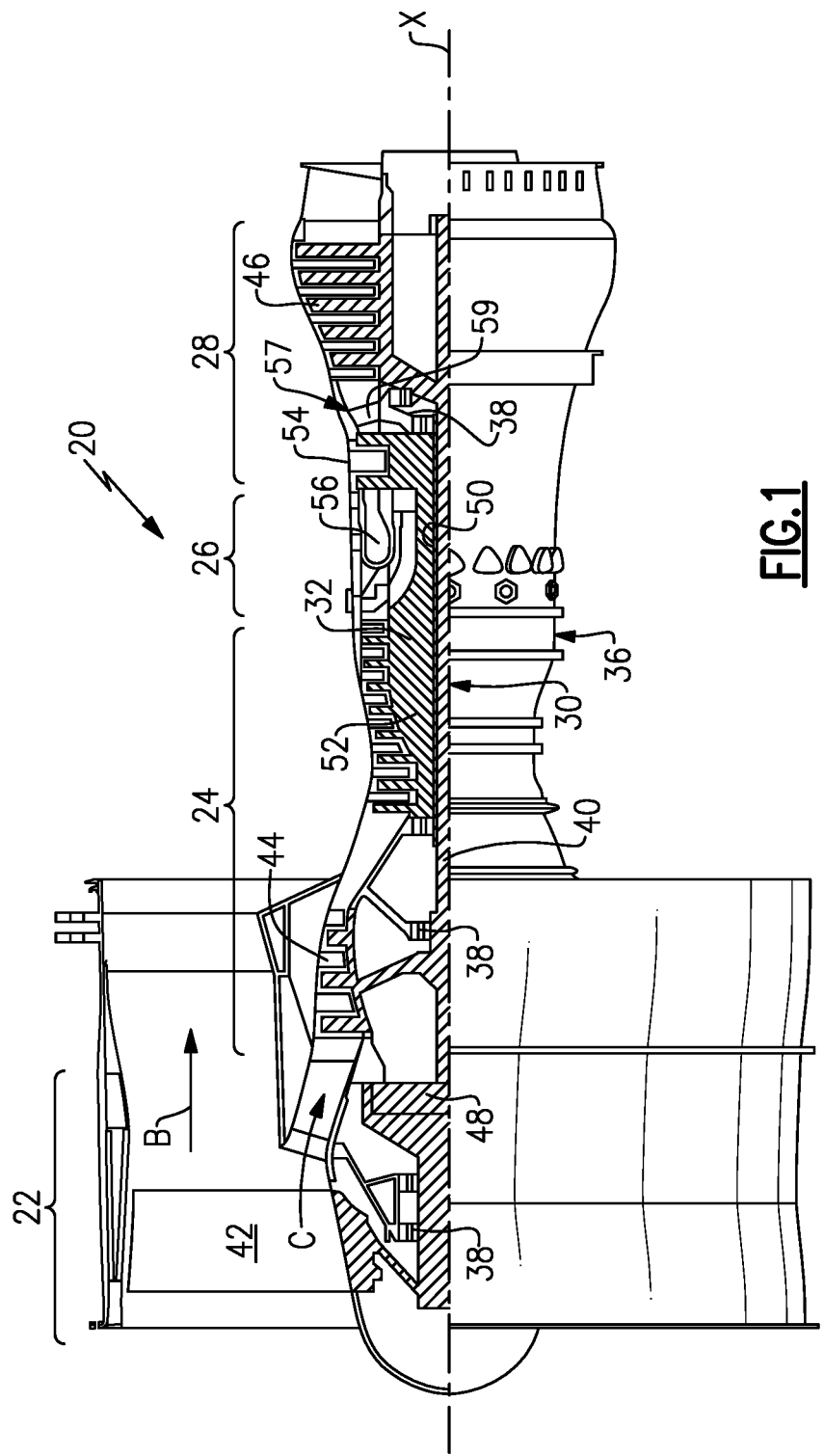
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/(518.7°R)]^{0.5}$. The "Low corrected fan tip speed", as disclosed herein according to one non-limiting embodiment, is less than about 1150 ft/second.

The disclosed cooling passage may be used in various gas turbine engine components. For exemplary purposes, a turbine blade 64 is described. It should be understood that the cooling passage may also be used in vanes, blade outer air seals, and turbine platforms, for example.

Figure 2A:
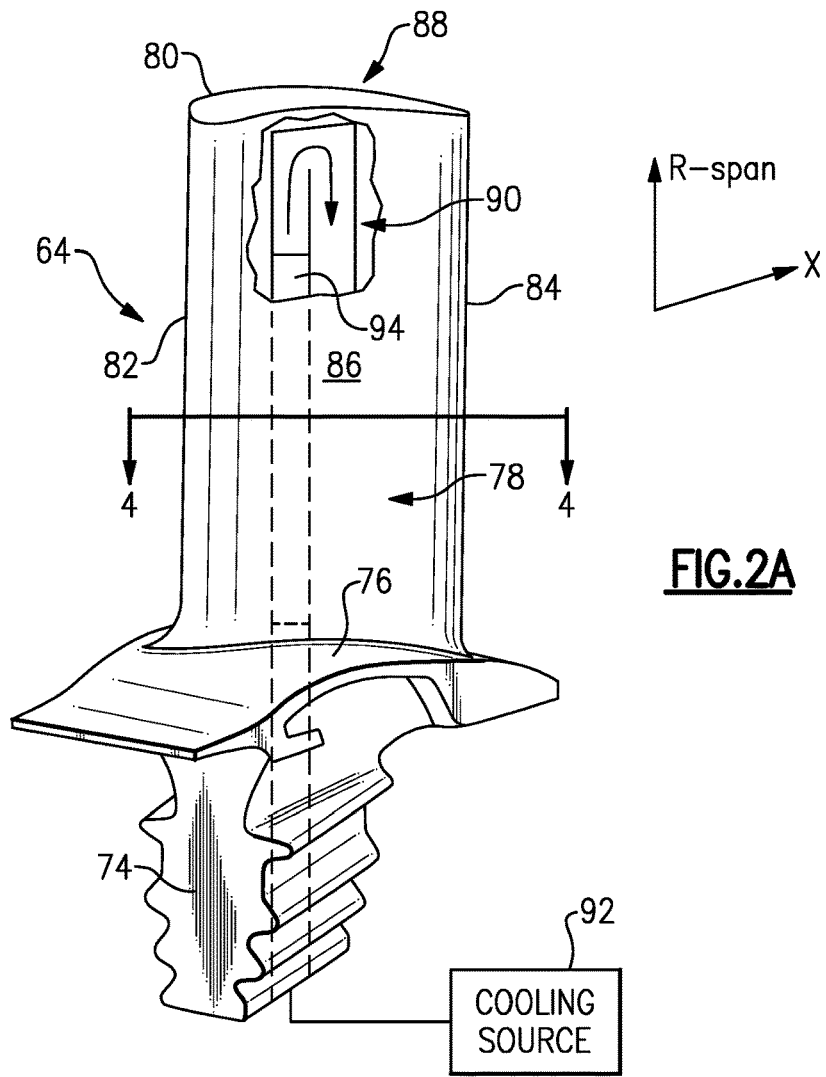
FIG. 2A is a perspective view of the airfoil having the disclosed cooling passage.
Figure 2B:
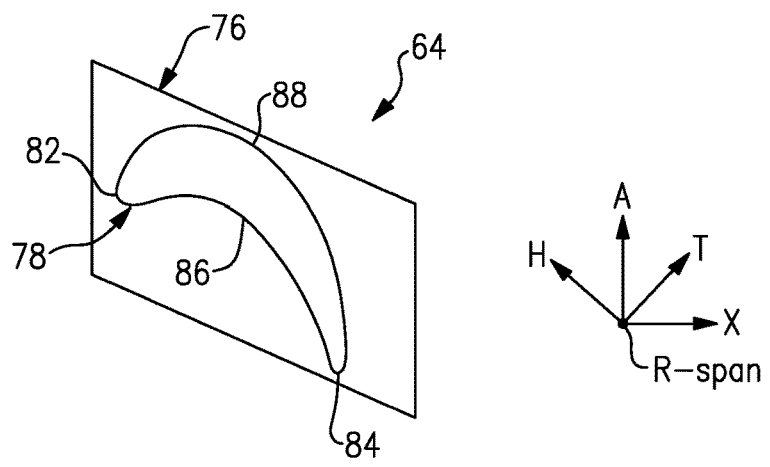
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction H from a leading edge 82 to a trailing edge 84. The airfoil 78 is provided between pressure (typically concave) and suction (typically convex) wall 86, 88 in an airfoil thickness direction T, which is generally perpendicular to the chord-wise direction H. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 4:
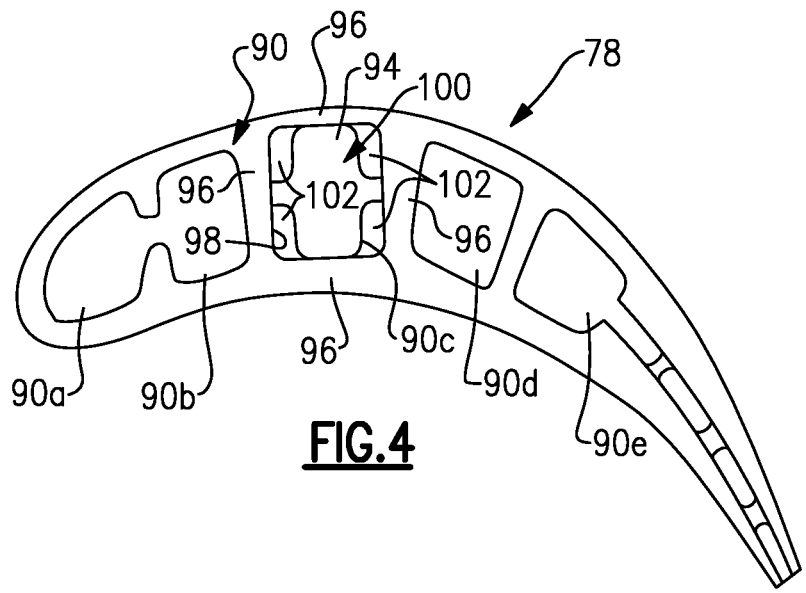
FIG. 4 is a cross-sectional view of the airfoil taken along line 4-4 in FIG. 2A.

Example cooling passages 90 illustrated in FIG. 2A are shown in more detail in FIG. 4.

A cooling source 92 is in fluid communication with the cooling passage 90. In the example, the cooling passage 90 is illustrated as having an obstruction 94 arranged within the cooling passage to restrict flow from the cooling source 92, which increases the velocity of the cooling fluid within the cooling passage 90.

An example cross-sectioned through the airfoil 78 is illustrated in FIG. 4. Although the obstruction 94 is illustrated as being arranged in only one of the cooling passages, the obstruction may be arranged in multiple cooling passages or portions thereof. The cooling passage 90 includes cooling passages 90a-90e. In the example, the obstruction 94 is arranged in the cooling passage 90c which is surrounded by walls 96 that provide a cooling surface 98.

In the example, the obstruction 94 is non-ferrous and engages the cooling surface 98 to locate the obstruction 94 relative to the walls 96. The obstruction 94 includes portions spaced from the cooling surface 98 to provide one or more gaps 102. The gaps 102 receive the cooling fluid from the cooling source 92 (FIG. 2A).

Figure 3:
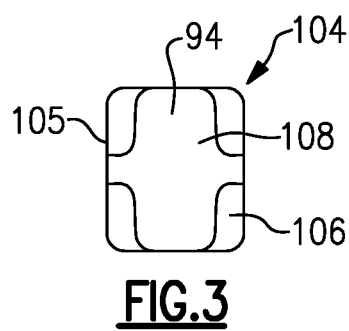
FIG. 3 is an end view of a core structure.

A multi-material core is used to produce the obstruction 94. Referring to FIG. 3, the core structure 104 includes first and second materials 106, 108, the second material 108 corresponds to the obstruction 94 in the finished gas turbine engine component. In one example, the first material 106 is a ceramic, the second material 108 is a refractory metal, such as molybdenum and/or niobium.

Generally, to provide the obstruction 94 within the cooling passage 90c, the core structure 104 is arranged within a wax mold, as is known in conventional investment casting processes, to produce a wax structure in the shape of the component to be cast. A perimeter 105 of the core structure 104 provides the cooling surface 98 within a space 100 of the cast component, as shown in FIG. 4. That is, the cast component engages the perimeter 105, which is provided by both the first and second materials 106, 108. In this manner, the second material 108 will locate the obstruction 94 relative to the cooling surface 98 once the first material 106 has been removed. The wax structure is then coated in ceramic slurry, which is permitted to harden into a ceramic mold. Molten metal, such as a nickel alloy, is poured into the ceramic mold, which removes the wax.

Figure 5:
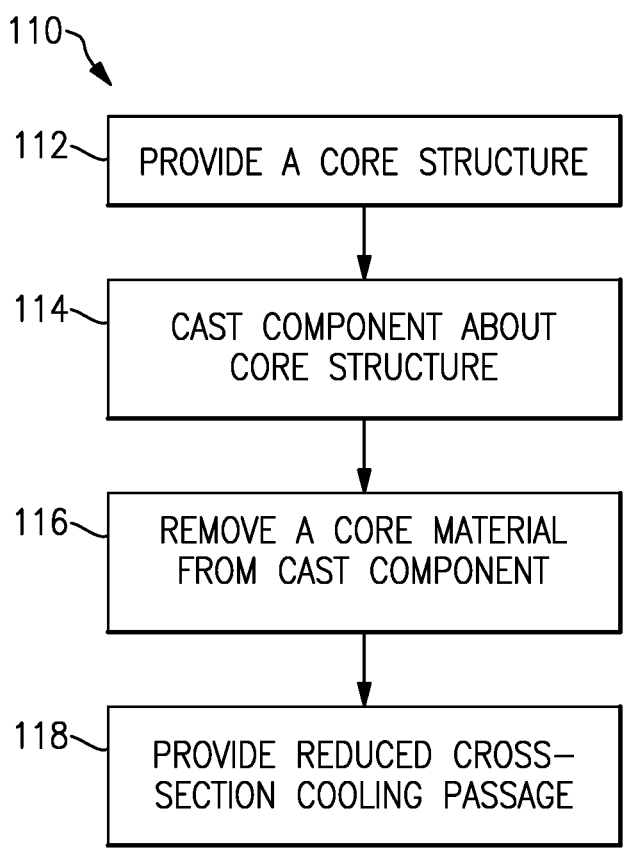
FIG. 5 is an example flow chart depicting an example method of manufacturing a gas turbine engine component, such as an airfoil.

Referring to the method 110 shown in FIG. 5, the core structure is provided having multiple, different materials in the example, as indicated at block 112. After the wax structure is produced, as described above, the gas turbine engine component is cast about the core structure, as indicated in block 114. A portion of the core structure is removed from the cast component. In one example, the first material 106, ceramic, is chemically removed, for example, as indicated at block 116. With the first material 106 removed, which leaves the gaps 102, the second portion 108 is left within the cast component to provide a reduced cross-section cooling passage 90, as indicated at block 118.

Although example embodiments have been disclosed, a worker of ordinary skill in this art would recognize that certain modifications would come within the scope of the claims. For example, the obstruction may be provided in passages other than cooling passages. The passages may be formed in other structures, such as blade outer air seals, platforms, combustor liner and exhaust liners. For that and other reasons, the following claims should be studied to determine their true scope and content.

What is claimed is:

1. A method of manufacturing a component, comprising:
providing a core structure including multiple, different materials provided by first and second materials;
casting a component about the core structure;
removing a first portion of the core structure from the cast component, wherein the first material corresponds to the first portion;
leaving a second portion of the core structure in the cast component to provide a reduced cross-section in the cast component, wherein the second material corresponds to the second portion; and
forming a finished gas turbine engine component with a passage that is defined by the cast component and the second portion that is left behind in the cast component.

2. The method according to claim 1, wherein the first material is ceramic.

3. The method according to claim 1, wherein the second material includes a refractory metal.

4. The method according to claim 1, wherein the core structure includes a perimeter, the cast component entirely engaging the perimeter during the casting step, and the second portion spaced from the cast component during the leaving step.

5. The method according to claim 1, wherein the passage is a cooling passage.

* * * * *